(12) United States Patent
Yoo

(10) Patent No.: US 6,433,856 B1
(45) Date of Patent: Aug. 13, 2002

(54) METHOD AND APPARATUS FOR MEASURING POSITION OF OBJECT FOR VEHICLE

(76) Inventor: Tae-Oog Yoo, 702-1, Sooyu-2dong, Kangbuk-gu, Seoul (KR)

( * ) Notice: Subject to any disclaimer, the term of this patent is extended or adjusted under 35 U.S.C. 154(b) by 0 days.

(21) Appl. No.: 09/662,147

(22) Filed: Sep. 14, 2000

(30) Foreign Application Priority Data

Nov. 10, 1999 (KR) ............................................. 99-49819

(51) Int. Cl.⁷ .............................. G01C 3/00; B60T 7/16
(52) U.S. Cl. ...................... 356/3.01; 356/3.09; 356/3.1; 356/3.11
(58) Field of Search ......................... 180/169; 356/3.01, 356/3.09, 3.1, 3.11

(56) References Cited

U.S. PATENT DOCUMENTS

| | | | |
|---|---|---|---|
| 4,457,625 A | * | 7/1984 | Greenleaf et al. |
| 4,866,262 A | * | 9/1989 | Van Der Werf et al. |
| 5,039,217 A | * | 8/1991 | Maekawa et al. |
| 5,146,290 A | * | 9/1992 | Hartrumpf |
| 5,177,462 A | | 1/1993 | Kajiwara |
| 5,291,207 A | | 3/1994 | Kikuchi et al. |
| 5,529,138 A | | 6/1996 | Shaw et al. |
| 5,933,240 A | * | 8/1999 | Jurca |

* cited by examiner

Primary Examiner—Stephen C. Buczinski
(74) Attorney, Agent, or Firm—Staas & Halsey LLP

(57) ABSTRACT

In a method, the light beams of two separated optical radar units (each of which are capable of emitting light pulses in a direction and receiving light pulses from the same direction) are directed to a point. The first optical radar unit emits a light pulse to the point and the second optical radar unit detects the light pulse reflected from the object at the point. After a time interval, the second optical radar unit emits a light pulse to the point and the first optical radar unit detects the light pulse reflected from the object at the point. If there is an object at the point, the time difference of the two detected signals from the two optical radar units is the switching time interval. By comparing the two detected signals from the two optical radar units, one can determine whether an object is at the point.

6 Claims, 14 Drawing Sheets

METHOD AND APPARATUS FOR MEASURING POSITION OF OBJECT FOR VEHICLE

BACKGROUND

1. Field of Invention

The present invention relates to a method and apparatus for measuring position of object for vehicle by using optical radars.

2. Prior Art

Microwave or ultrasonic radar systems have been known to measure position of object for vehicle. A problem of such systems is interference from other radar systems where significant number of vehicles equipped with the same or similar radar systems are involved. Another disadvantage of such systems is that it is difficult to make an accurate measurement of distance to an object in short range. Optical radar systems using laser are well known. For example, U.S. Pat. No. 5,529,138 dated Jun. 25, 1996 and U.S. Pat. No. 5,177,462 dated Jan. 5, 1993 disclose the optical radar systems. In the optical radar systems, distance to an object is obtained by measuring a propagation time of light pulse between the vehicle and the object or by measuring a shift of image formed on image sensor. These systems also have the interference problem and the difficulty of measuring position of object in short range. Thus, it is an object of the present invention to provide a method and apparatus for measuring position of object, wherein the foregoing disadvantages are improved. The method and apparatus of the present invention easily avoids the interference from other vehicles equipped with the same systems and can accurately measure position of object in short range.

SUMMARY

It is an object of the present invention to provide a method and apparatus for measuring position of object for vehicle.

In the first embodiment, a pair of two optical radar units separated by a distance is mounted at the rear side of the vehicle to detect objects behind the vehicle. Each optical radar unit can emit light pulses in a direction and receive light pulses coming from the same direction as the emitted light beam. The light beams of the two separate optical radar units are directed to a point. One of the two optical radar units, which is called the first optical radar unit, emits a light pulse to the point and the other, which is called the second optical radar unit, detects the light pulse reflected from the point. After a time interval, the second optical radar unit emits a light pulse to the point and the first optical radar unit detects the light pulse reflected from the point. If there is an object at the point, the time difference of the two signals detected by the two optical radar units is the switching time interval. Thus, by comparing the two detected signals, one can determine whether an object is at the point or not. A time delay circuit and a multiplier circuit can be used to compare the two detected signals. The time delay circuit delays the signal detected from the second optical radar unit by the switching time interval and in the multiplier circuit the signal detected from the first optical radar unit is multiplied by the delayed signal. The result of the multiplication is displayed at the position of the point on a display means. The position of the point is determined on the basis of the two directions of the light beams and the separation of the two optical radar units. By changing the directions of the two light beams, the optical radar units scan an area. This method easily avoids interference from other vehicles equipped with the same or similar optical radar units and accurately measures position of object in short range without using sophisticated means.

The second embodiment uses a plurality of optical radar units. This comprises two sets of optical radar units. Each set has four optical radar units. Two optical radar units are selected in the two sets to form a scanning point. There are sixteen possible combinations of optical radar units. The use of the plurality of optical radar units reduces time to scan an area and increases density of scanning points in the area.

The third embodiment uses at least one optical radar unit and at least one light detecting means separated by a distance. The light beams of the optical radar unit and the light detecting means are directed to a point. The optical radar unit emits a light pulse to the point and the optical radar unit and the light detecting means detect the light pulse reflected from the point at the same time. By comparing the two signals detected by the optical radar unit and the light detecting means, one can determine whether an object is at the point or not. The position of the point is determined on the basis of the two directions of the light beams and the separation of the optical radar unit and the light detecting means.

The method and apparatus of the present invention easily avoids interference from the vehicles equipped with the same systems and can accurately measure positions of objects in short range.

DETAILED DESCRIPTION OF THE PREFERRED EMBODIMENTS

Figure 1:
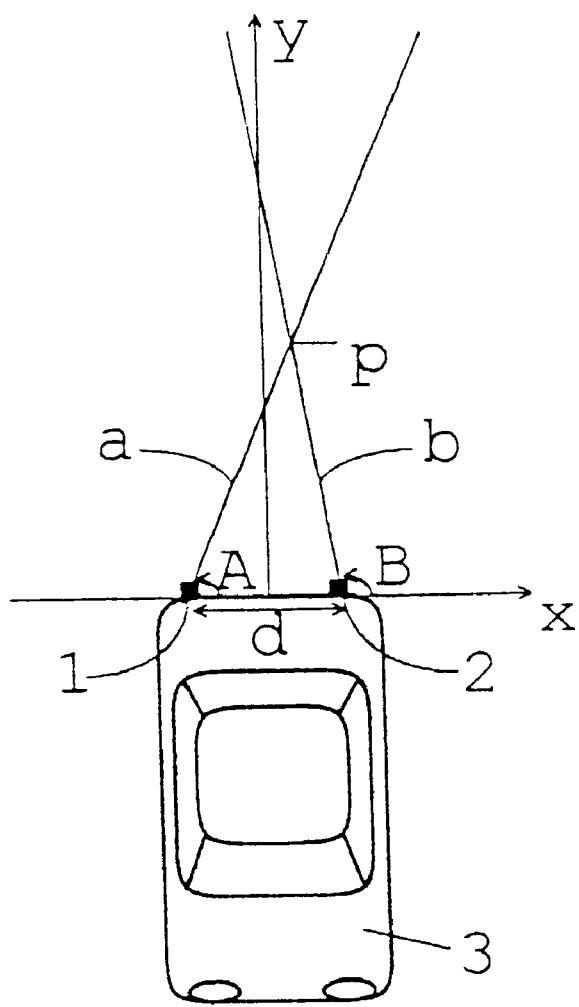
FIG. 1 illustrates two optical radar units mounted at the rear side of vehicle and x and y coordinates.

In a first embodiment of the present invention, the apparatus for measuring position of object comprises two optical radar units. FIG. 1 illustrates two optical radar units 1 and 2 mounted at the rear side of a vehicle 3. Each optical radar unit can emit light pulses in a direction and receive light pulses coming from the same direction as the emitted light beam. In FIG. 1, the x-axis is the transverse direction and the y-axis is the longitudinal direction of the vehicle 3. In this reference frame, the optical radar unit 1 is located at x 0.5 d on the x-axis and the optical radar unit 2 at x=0.5 d on the x-axis, where d is the separation of the optical radar units 1 and 2. The light beams a and b of the optical radar units 1 and 2 respectively are directed to point p by setting the directions of the light beams. Angle between the direction of the light beam a of the optical radar unit 1 and the positive x-axis is A and angle between the direction of the light beam of the optical radar unit 2 and the positive x-axis is B. The x and y coordinates of point p are x 0.5 d(tanB+tanA)/(tanB−tanA) and y=d tanB+tanA/(tanB−tanA). Thus, the position of point p is determined by angles A and B and separation d.

Figure 2A:
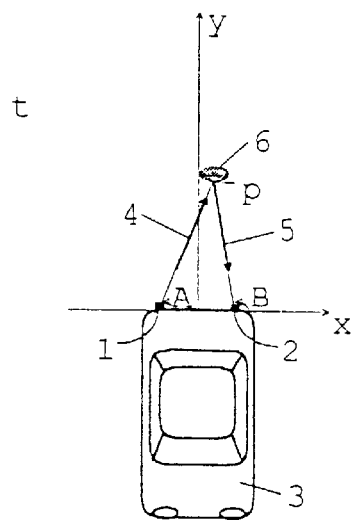
FIGS. 2a and 2b illustrate two optical radar units detecting an object at point p.
Figure 2B:
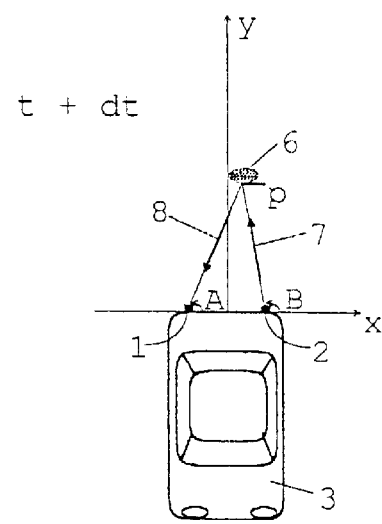
Figure 3A:
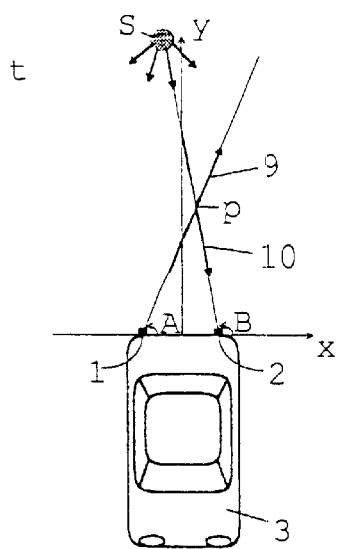
FIGS. 3a and 3b illustrate interference from light source S.
Figure 3B:
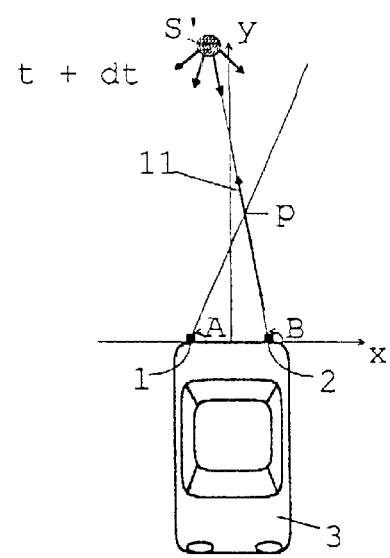

To determine whether an object is at point p or not, the optical radar unit 1 emits a light pulse to point p at time t and the optical radar unit 2 detects a light pulse reflected from point p. If the optical radar unit 2 does not detect the light pulse, then there is no light scattering object at point p. If the optical radar unit 2 detects light pulse, there are two possibilities:

1. there is a light scattering object at point p. As illustrated in FIG. 2a, the optical radar unit 1 emits the light pulse 4 to point p at time t and the optical radar unit 2 detects the light pulse 5 reflected from the object 6 at point p; and 2. there is no light scattering object at point p. As illustrated in FIG. 3a, the light pulse emitted from the optical radar unit 1 passes point p but the optical radar unit 2 detects a light pulse 10 from other light source S. To resolve this problem, the optical radar unit 2 emits a light pulse 7(11) to point p at time t+dt and the optical radar unit 1 detects light pulse reflected from the point as shown in FIG. 2b(3b). That is, after time interval dt, the functions of the optical radar units 1 and 2 are switched. If the optical radar unit 1 detects a light pulse 8, then there is a light scattering object 6 at point p as shown in FIG. 2b. As shown in FIG. 3b, if the optical radar unit 1 detects no light pulse, then there is no light scattering object at point p even though the optical radar unit 2 detected the light pulse switching time interval dt ago. As a result, one concludes that there is a light scattering object at point p if both of the optical radar units 1 and 2 detect the reflected light pulses and if the time interval of the two detected light pulses is switching time interval dt. This method easily avoids the interference from the other light source as shown in FIGS. 3a and 3b. The two signals detected by the optical radar units 1 and 2 are compared in a signal comparing means. A simple example of the signal comparing means is a combination of a time delay circuit and a multiplier circuit.

Figure 4A:
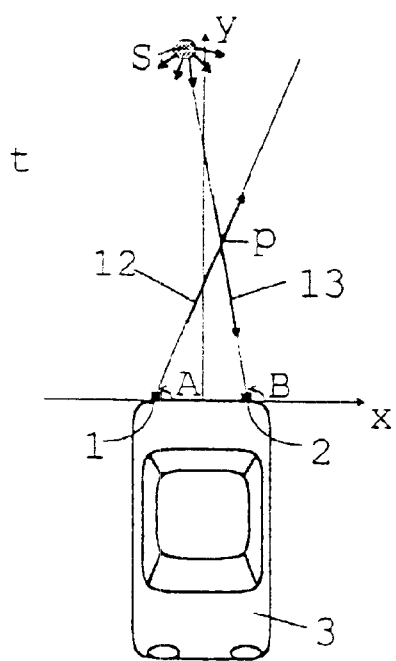
FIGS. 4a and 4b illustrate interference from two light sources S and S'.
Figure 4B:
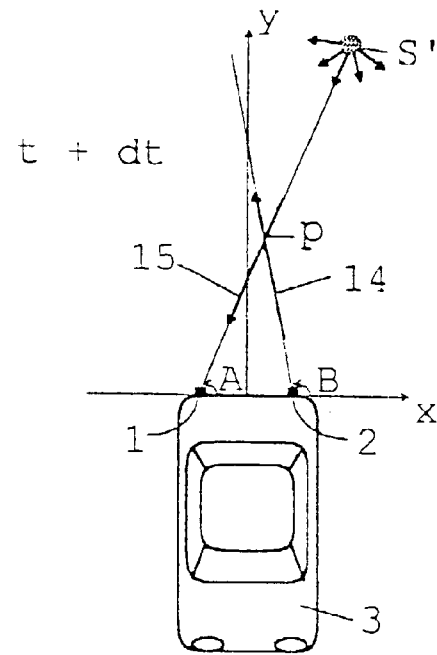

It is possible that the position measuring apparatus indicates an object at point p even though there is no light scattering object at point p. This happens when the optical radar unit 2 detects a light pulse 13 from a light source S as shown in FIG. 4a and the optical radar unit 1 detects a light pulse 15 from another light source S' after switching time interval dt as shown in FIG. 4b. In FIG. 4a, the light pulse 12 emitted from the optical radar unit 1 at time t passes point p and in FIG. 4b, the light pulse 14 emitted from the optical radar unit 2 at time t+dt passes point p. However, this possibility is very rare since it happens only when two light sources S and S' exist in two specific directions at two specific times, t and t+dt. Hence, this method measures positions of objects without interference from other vehicles' optical radar units in a road.

Figure 5:
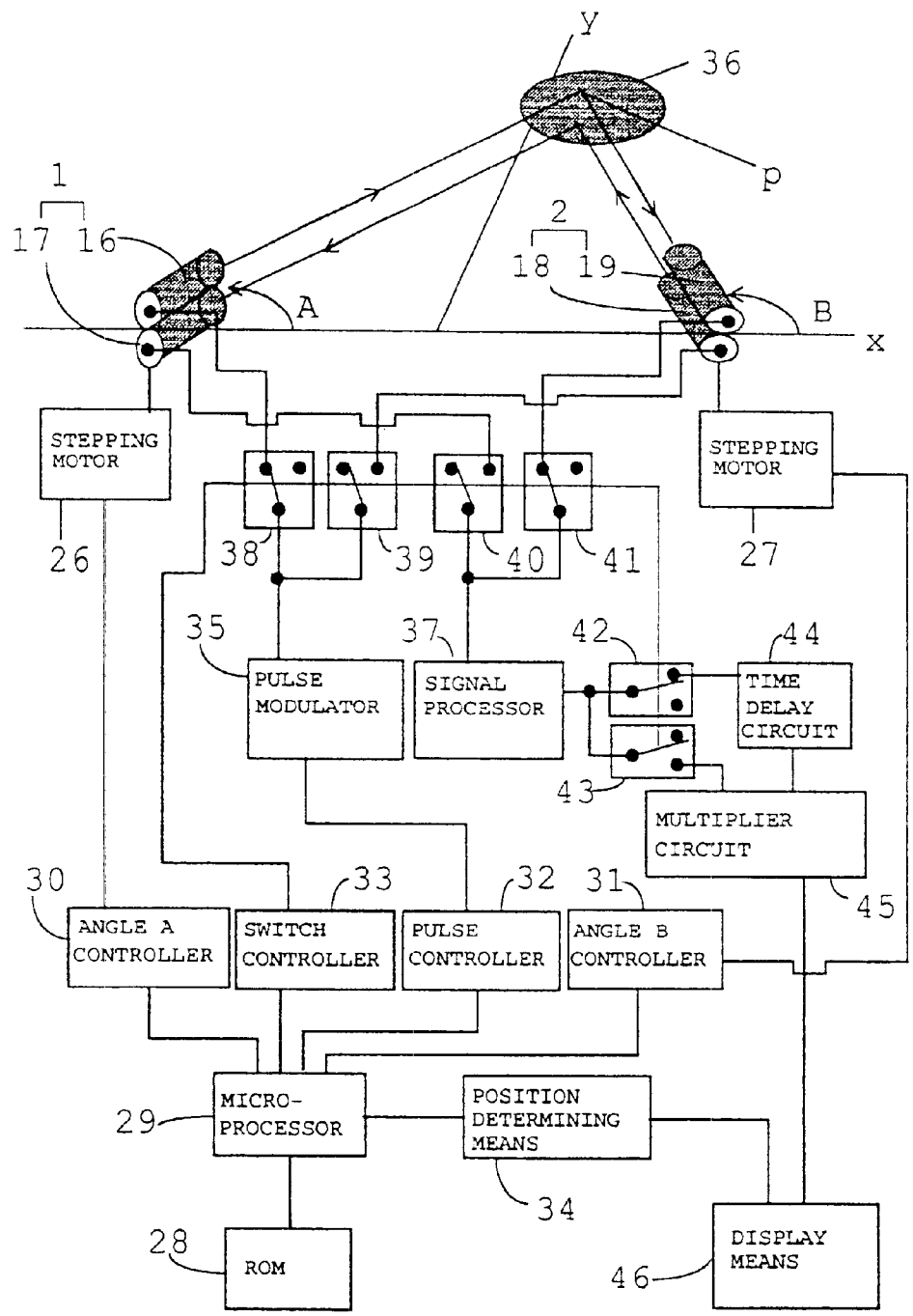
FIG. 5 is a block diagram of the first embodiment of the present invention.
Figure 6:
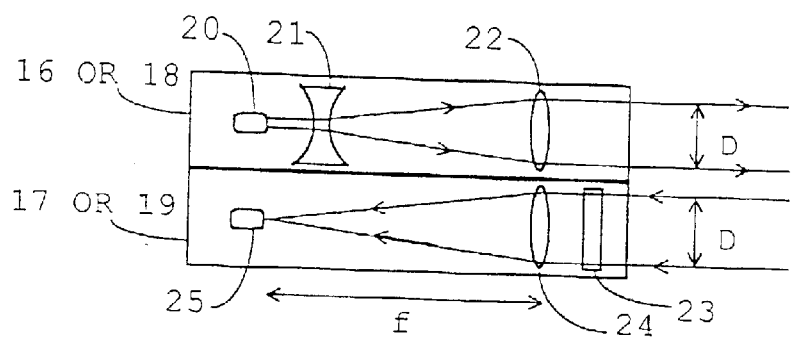
FIG. 6 illustrates a longitudinal sectional side view of optical radar unit.

FIG. 5 illustrates a block diagram of the first embodiment of e presentis invention. The optical radar unit 1 comprises a light emitting means 16 and a light detecting means 17 arranged in a parallel direction with each other, so that they can emit light pulses and detect light pulses in the same direction. The optical radar unit 2 comprises a light emitting means 18 and a light detecting means 19 arranged in a parallel direction with each other. As an example of the optical radar unit, FIG. 6 illustrates a longitudinal sectional side view of each optical radar unit. In FIG. 6, the light emitting means 16 or 18 comprises a light emitter 20 which is a semiconductor infrared laser diode, a beam expander 21 and a collimating lens 22.

The collimated beam width is D. The light detecting means 17 or 19 comprises an optical filter 23, a converging lens 24 of focal length f and a light detector 25 which is an avalanche photodiode. In FIG. 5, stepping motors 26 and 27 rotate the optical radar units 1 and 2 to set the directions of the light beams. By changing angles A and B that are the directions of the optical radar units 1 and 2 respectively, the optical radar units 1 and 2 scan an area point by point. A predetermined sequence of the angle pairs (A,B) is stored in ROM(read only memory) as a scanning program. A microprocessor 29 executes the scanning program and sends signals to controllers 30–34. Angle A controller 30 and angle B controller 31 send signals to the stepping motors 26, 27 to set angles A and B. Pulse controller 32 activates the pulse modulator 35 to make a light pulse of width $\tau$. The light emitting means 16 emits the light pulse to point p. The light pulse reflected from an object 36 is detected by the light detecting means 19 and the detected signal is processed by a signal processor 37. After switching time interval dt, switch controller 33 changes switches 38–43. One can use PIN diode switches for fast switching. Then the light emitting means 18 emits a light pulse to point p and the light detecting means 17 detects the light pulse reflected from the object 36. Switching time interval dt should be long enough to cover the propagation delay time of the light pulse between the optical radar unit and the object. For example, if the maximum range of the scanning area is 150 m, the propagation delay time of the light pulse is approximately 1 microsecond. So, switching time interval dt should be longer than 1 microsecond to scan the area. Time difference between the light pulse detected by the light detecting means 19 and the light pulse detected by the light detecting means 17 should be switching time interval dt. The signals from the light detecting means 19, 17 are sent to a signal comparing means. The signal comparing means comprises a time delay circuit 44 and a multiplier circuit 45. The time delay circuit 44 delays the signal from the light detecting means 19 by switching time interval dt. The delayed signal is multiplied by the signal from the light detecting means 17 at the multiplier circuit 45. The output of the multiplier circuit 45 is displayed at the position of point p on display means 46. The position of point p is determined by a position determining means 34 on the basis of angles A and B and separation d.

Figure 7:
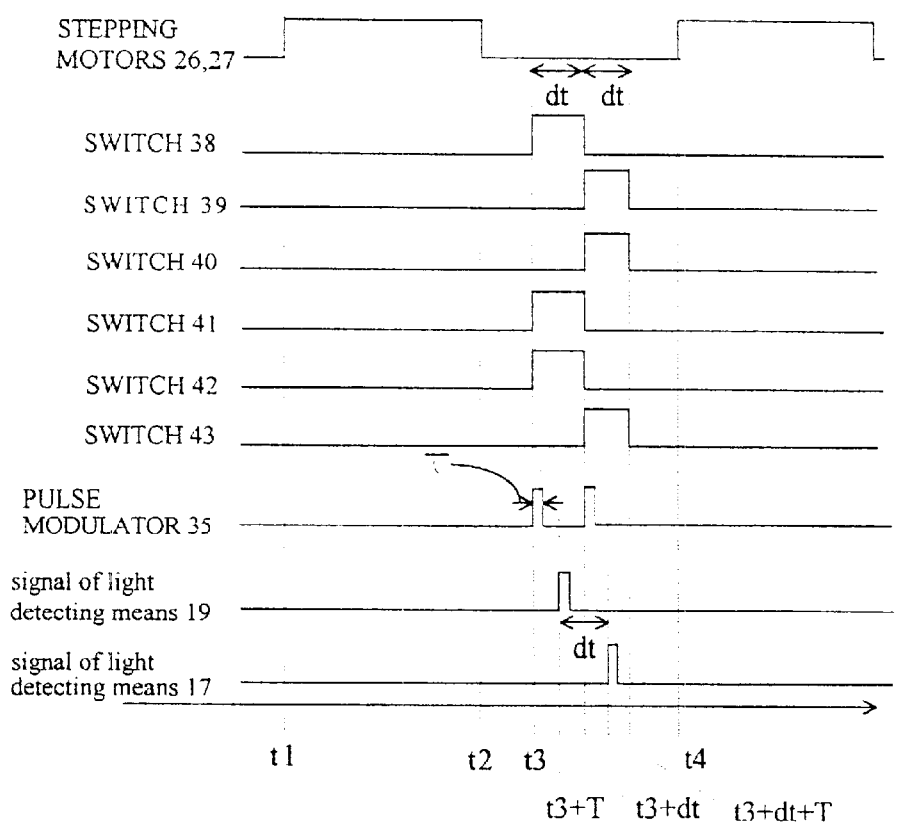
FIG. 7 is a timing diagram for the stepping motors, the switches, the pulse modulator and the signals in the first embodiment.

FIG. 7 is a timing diagram of the stepping motors 26, 27, the switches 38–43, the pulse modulator 35 and the signals from the light detecting means 17, 19. In FIG. 7, the angle controllers 30, 31 send signals to the stepping motors 26, 27 at time t1 and angles A and B are set at time t2. At time t3, the pulse controller 32 sends a signal to the pulse modulator 35 and the light emitting means 16 emits a light pulse of width τ. At time t3+T, the light detecting means 19 detects the light pulse reflected from the object 36, where T is the propagation delay time of the light pulse. At time t3+dt, the switch controller 33 changes the switches 38–43 and the light emitting means 18 emits a light pulse. At time t3+T+dt, the light detecting means 17 detects the light pulse reflected from the object 36. At time t4, the angle controllers 30, 31 send signals to the stepping motors 26, 27 to change angles A and B and the above procedure is repeated.

Figure 8A:
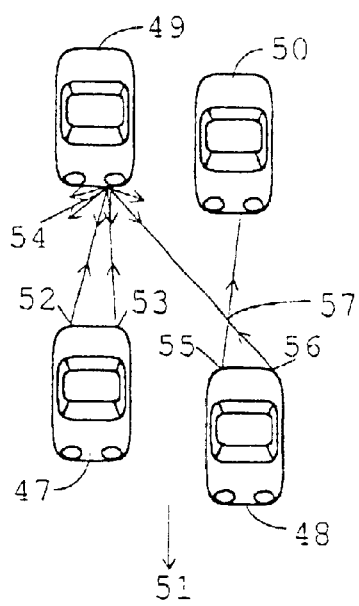
FIGS. 8a, 8b and 8c illustrate the operations of the position measuring apparatus in the first embodiment of the present invention.
Figure 8B:
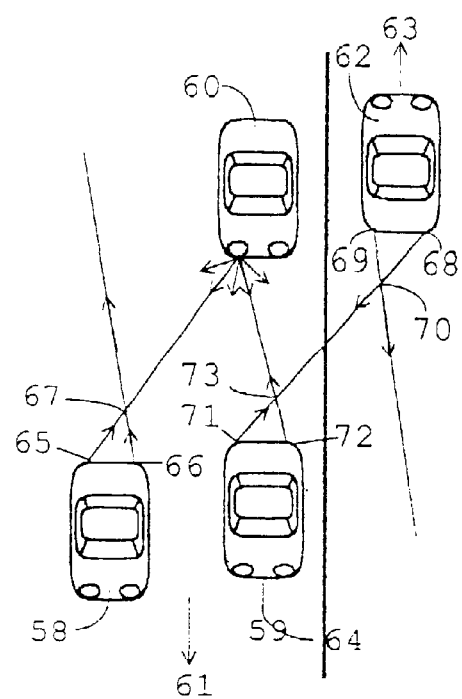
Figure 8C:
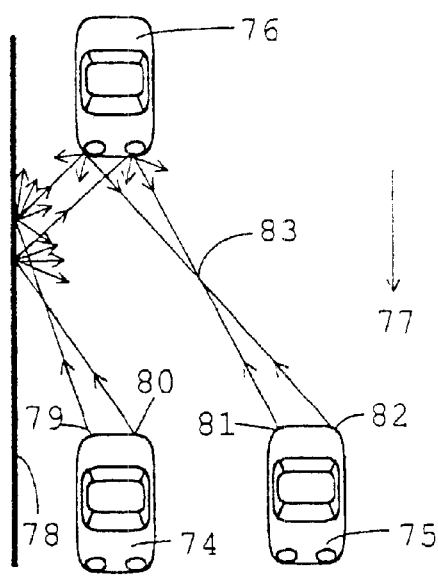

FIGS. 8a–8c illustrate the operations of the position measuring apparatus in the first embodiment when there are several vehicles equipped with the same apparatuses in a road. In FIG. 8a, vehicles 47–50 are moving in the same direction 51. The optical radar units 52, 53(not shown in detail) of the vehicle 47 are scanning a point 54 at which the front side of the vehicle 49 lies. The position measuring apparatus of the vehicle 47 correctly detects an object at the point 54 even though there is a reflection of the light pulse emitted from the optical radar unit 56 of the vehicle 48. The signal comparing means of the position measuring apparatus gets rid of the interference from the reflection. In the meantime, the optical radar units 55, 56 of the vehicle 48 are scanning a point 57. The optical radar unit 56 may detect the reflection of the light pulse emitted from the optical radar units 52, 53 of the vehicle 47. However, the position measuring apparatus of the vehicle 48 correctly shows no object at the point 57 since the optical radar unit 55 of the vehicle 48 detects no light pulse.

In FIG. 8b, vehicle 58–60 are moving in the same direction 61 and vehicle 62 is moving in the opposite direction 63 around the central line 64 of the road. The position measuring apparatus of the vehicle 58 shows no object at a point 67 since the optical radar unit 66 detects no light pulse. Similarly, the position measuring apparatus of the vehicle 62 shows no object at a point 70. The optical radar unit 71 of the vehicle 59 may detect the light pulse emitted from the optical radar unit 68 of the vehicle 62 and the optical radar unit 72 of the vehicle 59 may detect the reflection of the light pulse emitted from the optical radar unit 65 of the vehicle 58. However, unless the time interval of the detected light pulses is switching time interval dt of the position measuring apparatus, the signal comparing means gets rid of the interference and the position measuring apparatus of the vehicle 59 correctly shows no object at the point 73. It is very rare that the time interval of the interference is switching time interval dt of the position measuring apparatus. In FIG. 8c, vehicles 74–76 are moving in the same direction 77. An object 78 that may be a guardrail or a building reflects the light pulsees emitted from the optical radar units 79, 80 of the vehicle 74 in all directions. The reflected light pulses are furthermore reflected at the vehicle 76. The optical radar units 81, 82 of the vehicle 75 are scanning a point 83. If the position measuring apparatuses installed in the vehicles 74, 75 are almost synchronized, the optical radar unit 82 of the vehicle 75 detects the reflection of the light pulse emitted from the optical radar unit 79 of the vehicle 74 and after switching time interval dt, the optical radar unit 81 of the vehicle 75 detects the reflection of the light pulse emitted from the optical radar unit 80 of the vehicle 74. Then the position measuring apparatus of the vehicle 75 incorrectly shows an object at the point 83 even though there is no object at the point 83. This interference happens only when the position measuring apparatuses installed in the vehicles 74 and 75 are synchronized. However, it is almost impossible to synchronize the position measuring apparatuses installed in two vehicles, that is to synchronize the light emissions in two different apparatuses. Also, this interference from the above synchronization of the position measuring apparatuses can be avoided by using different switching time intervals. Hence, the position measuring apparatus of the present invention correctly works without interference from other vehicles equipped with the same apparatus.

In the first embodiment, the position measuring apparatus utilized two optical radar units. However, one can use a plurality of optical radar units in various ways. The advantage of using the plurality of optical radar units is that it reduces scanning time and increases density of scanning points in a scanning area.

Figure 9:
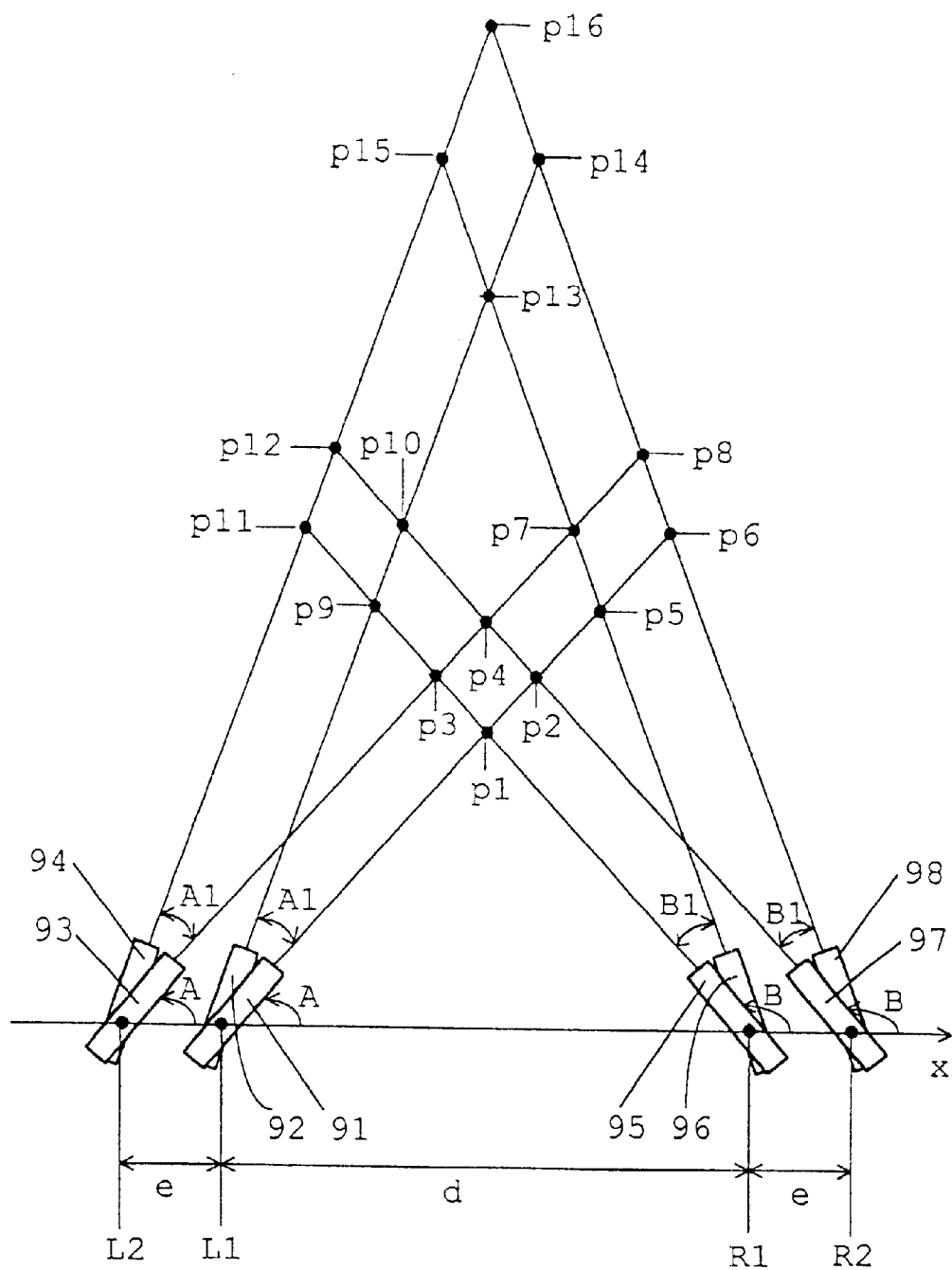
FIG. 9 illustrates a top view of the optical radar units in the second embodiment of the present invention.

In a second embodiment, the position measuring apparatus utilizes two sets of optical radar units. Each set has four optical radar units. FIG. 9 illustrates a top view of the optical radar units in the second embodiment. In the left set, the optical radar units 91, 92 share an axis of rotation, L1 but they are separated by fixed angle A1. The optical radar units 93, 94 are separated by the same angle A1 around an axis of rotation, L2. The axes of rotation L1 and L2 are separated by distance e. The four optical radar units are rotated together by a stepping motor. There may be various ways to rotate the four optical radar units together.

For example, the axis of rotation, L2 is connected to the axis of rotation, L1 by a set of gears and a stepping motor rotates the axis of rotation, L1. Similarly, in the right set, the optical radar units 95, 96 are separated by fixed angle B1 around an axis of rotation, R1 and the optical radar units 97, 98 by the same angle B1 around an axis of rotation, R2. The axes of rotation, R1 and R2 are separated by distance e. The four optical radar units are rotated together. The distance between the axis of rotations, L1 and R1 is d. A combination of an optical radar unit in the left set and an optical radar unit in the right set forms a scanning point. There are sixteen combinations for sixteen scanning points p1–p16 at a given pair of angles A and B, (A,B) as shown in FIG. 9. Among the sixteen points, points p2, p6, p10 and p14 are close to the points p3, p7, p11 and p15, respectively if distance e is much smaller than distance d. For example, the y coordinates of the points p2 and p3 are same and the difference in the x coordinates is e at any angles A and B. Hence, twelve combinations are chosen to form twelve scanning points p1,p2,p4,p5,p6,p8,p9,p10,p12,p13,p14 and p16.

Figure 10:
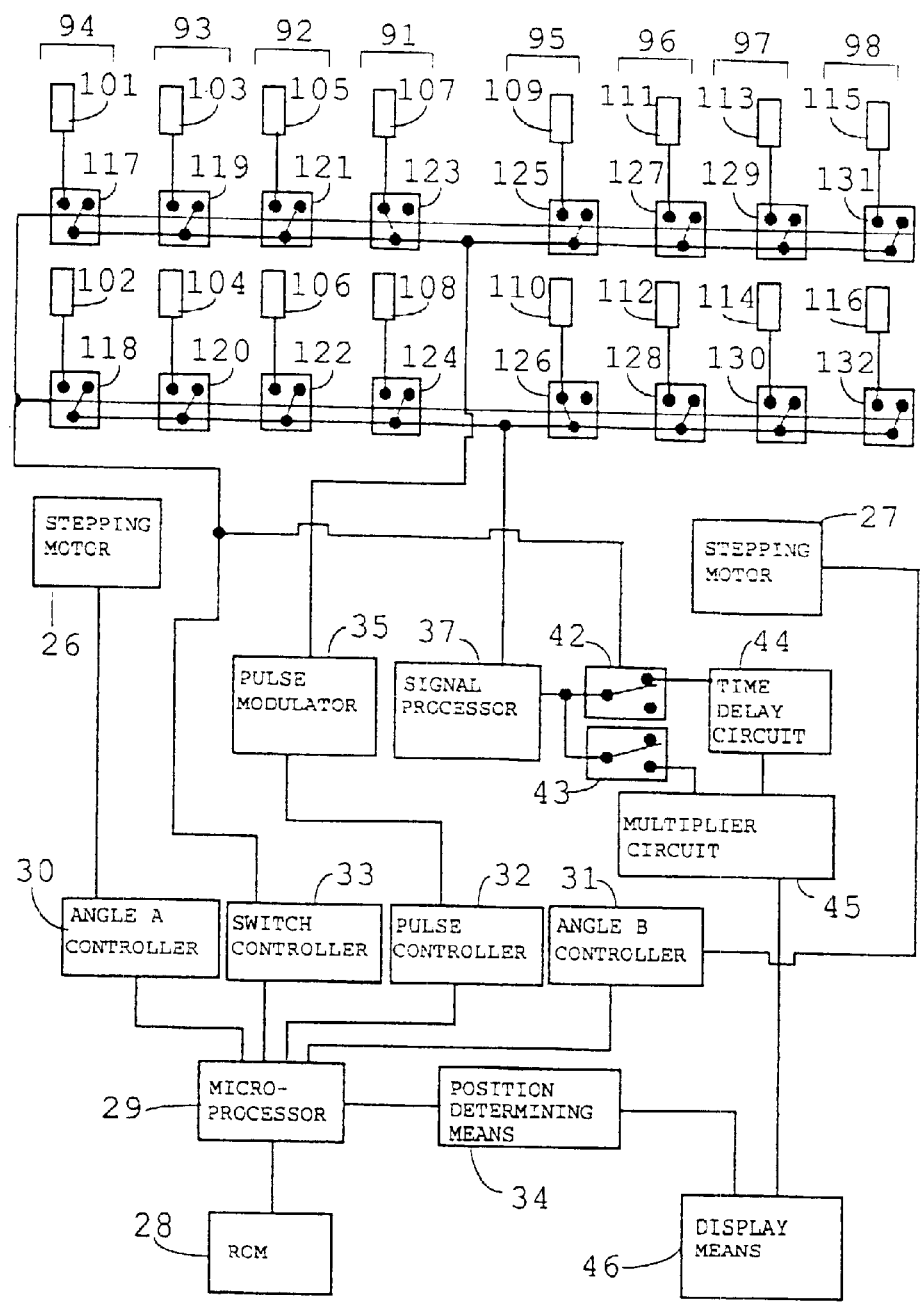
FIG. 10 is a block diagram of the second embodiment of the present invention.

FIG. 10 is a block diagram of the second embodiment. In FIG. 10, the numeral numbers 101, 103, 105 and 107 represent the light emitting means and the numeral numbers 102, 104, 106 and 108 the light detecting means of the optical radar units 94, 93, 92 and 91 respectively. Similarly, the numeral numbers 109, 112, 113 and 115 represent the light emitting means and the numeral numbers 1110, 112, 114 and 116 the light detecting means of the optical radar units 95, 96, 97 and 98, respectively. The switch controller 33 selects a combination out of the twelve combinations of the optical radar units. In FIG. 10, the switch controller 33 selects the combination of the optical radar units 91 and 95 by turning on the switches 123 and 126. The functions of other components in FIG. 10 are the same as those in FIG. 5.

Figure 11:
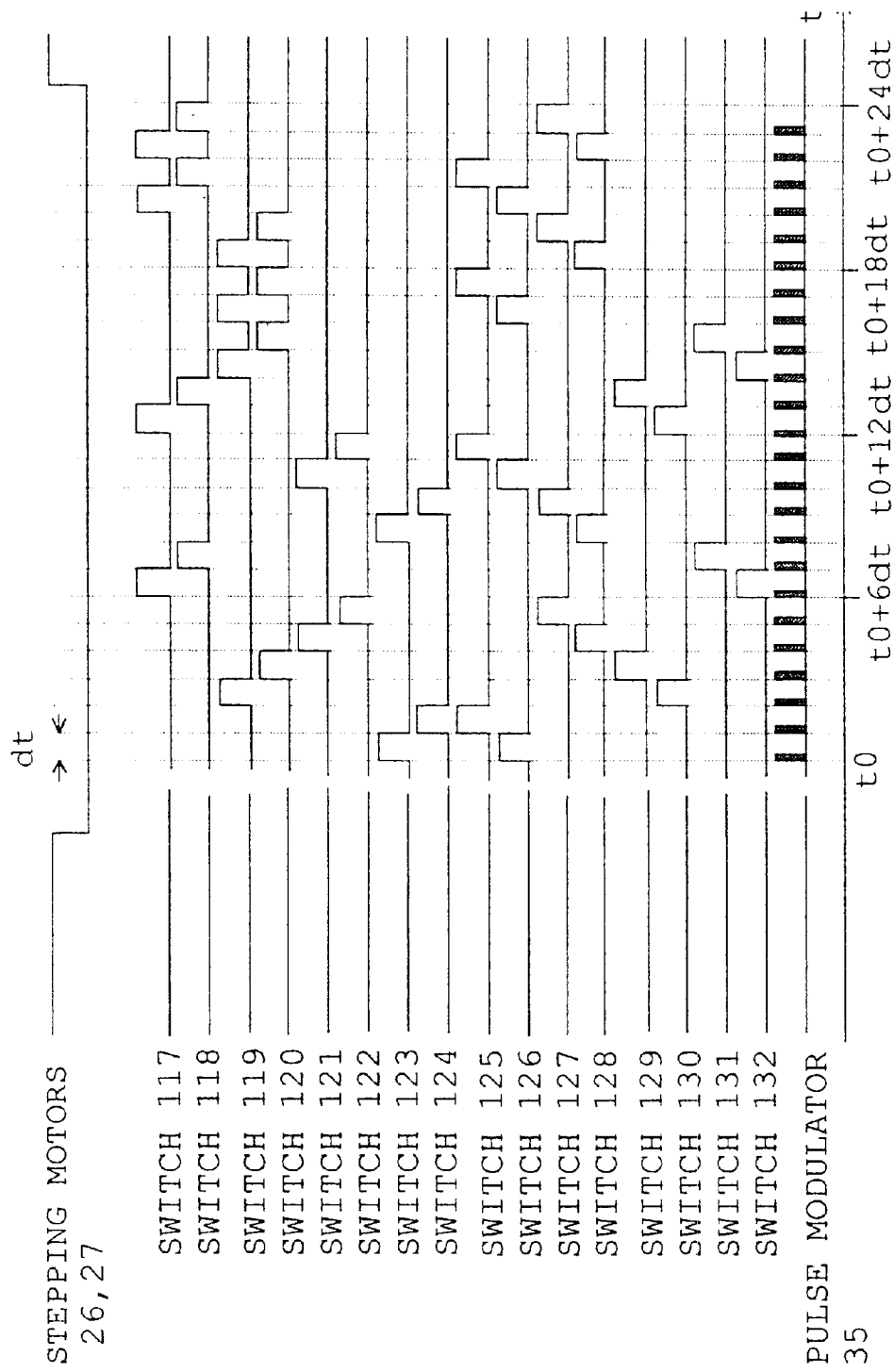
FIG. 11 is a timing diagram for the stepping motors, the switches and the pulse modulator in the second embodiment.

FIG. 11 is a timing diagram for the stepping motors 26, 27, the switches 117–132 and the pulse modulator 35. After setting angles A and B, the time sequence of the twelve scanning points is p1 - p4 - p13 - p16 - p5 - p9 - p12- p8 - p2 - p6 - p10 - p14 from time t0 to time t0+24 dt, where dt is the switching time interval.

Figure 12:
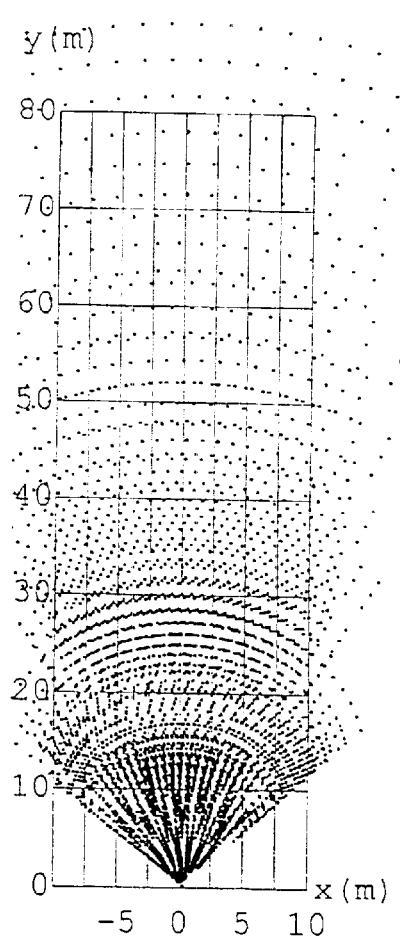
FIG. 12 illustrates an example of scanning an area in the second embodiment.

FIG. 12 illustrates an example of scanning an area. The dots in FIG. 12 represent the scanning points of the optical radar units. The x and y axes are described in FIG. 1. The origin of the x and y coordinates is the center of the rear side of the vehicle(not shown in FIG. 12) equipped with the position measuring apparatus. In this example, the distance between the axis of rotation, L1 and the axis of rotation, R1 is d=1 m. The distance between the axis of rotation, Li(R1) and the axis of rotation, L2(R2) is e=4.5 cm. The angular separation between the optical radar units 91 and 92(93 and 94) is A1=0.5° and the angular separation between the optical radar units 95 and 96(97 and 98) is B1=0.3°. The range of angles A and B is chosen to be from 45° to 135°. There are many ways to choose steps of angles A and B. However, one should consider both scanning time and density of the scanning points in a scanning area. If the steps of the angles are small, then the density of scanning points increases but the scanning time increases too and vice versa. In this example, the step of angle A is 1° and step of angle B is 0.6°.

Figure 13:
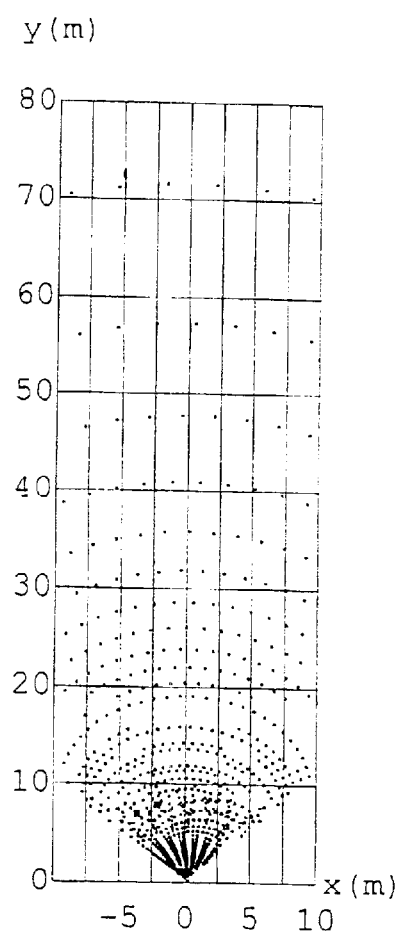
FIG. 13 illustrates the pairs of angles A and B represented as points.

FIG. 13 illustrates the predetermined pairs of angles, (A,B) which are represented as points (x,y) in the x and y coordinates. At each pair (A,B) of angles, the optical radar units can scan maximum twelve points p1, p4, p13, p16, p5, p9, p12, p8, p2, p6, p10 and p14 as shown in FIG. 9. In the example shown in FIG. 12, the scanning points at a given pair (A,B) are chosen as follows:

Four points p1, p4, p13 and p16 for 0.5 m≦y≦10 m;

eight points p1, p4, p13, p16, p5, p9, p12 and p8 for 10 m≦y≦20 m; and twelve points p1, p4, p13, p16, p5, p9, p12, p8, p2, p6, p10 and p14 for 20 m≦y.

If switching time interval dt is 1 microseconds, the scanning time at a given angle pair (A,B) is 8 microseconds for 0.5 m≦y≦10 m, 16 microseconds for 10 m≦y≦20 m and 24 microseconds for 20 m≦y. The sequence of angle pairs (A,B) starts from (A=45°, B=135°) which is point (x=0, y=0.5 m) and ends at (A=67°, B=69.6°) which is point (x=7.573 m, y=19.019 m) after following all points in FIG. 13. Total number of angle pairs (A,B) is 983. Two stepping motors with two sets of gears are used to change the steps of angles A and B. Total number of steps of stepping motors is 1013 to set the 983 angle pairs (A,B). If start-stop pulse rate of the stepping motors is higher than 3000 pulse per second, then it takes less than 0.338 seconds for the stepping motors to run 1013 steps. Including the scanning time at each step that is maximum 24 microseconds, it takes less than 0.338 seconds +983*24 microseconds=0.362 seconds for the position measuring apparatus to scan the area in FIG. 12.

Figure 14:
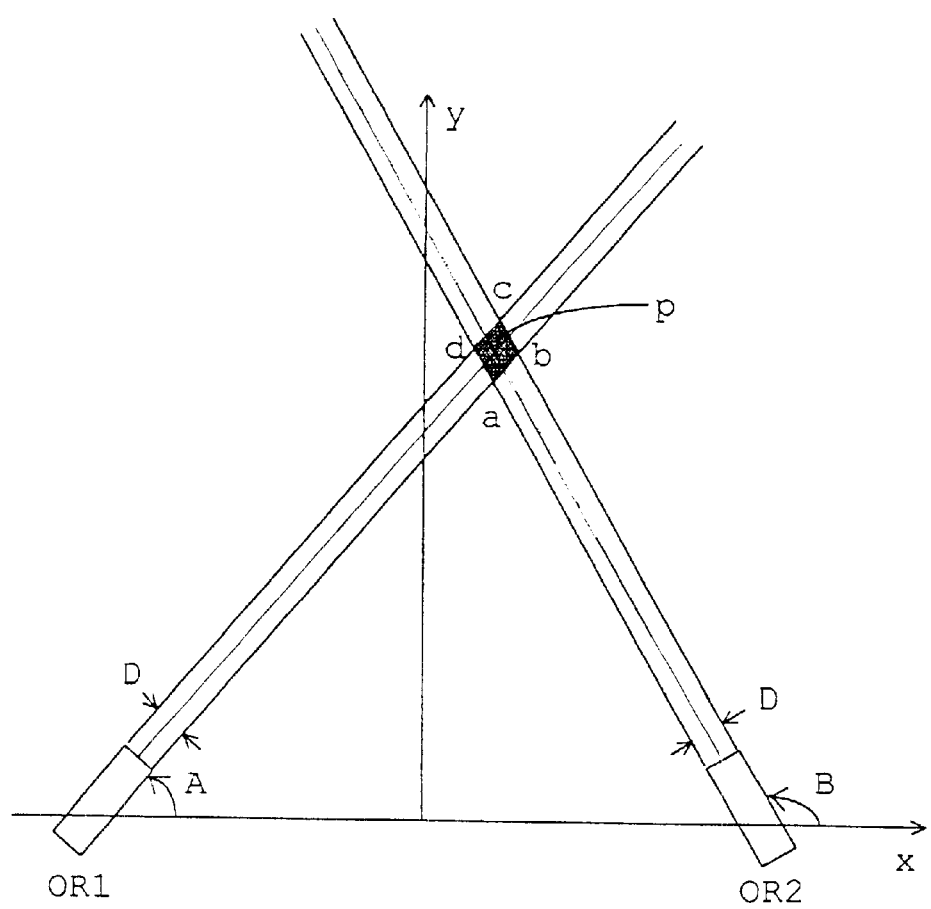
FIG. 14 illustrates an intersection of two beams of beam width D.
Figure 15:
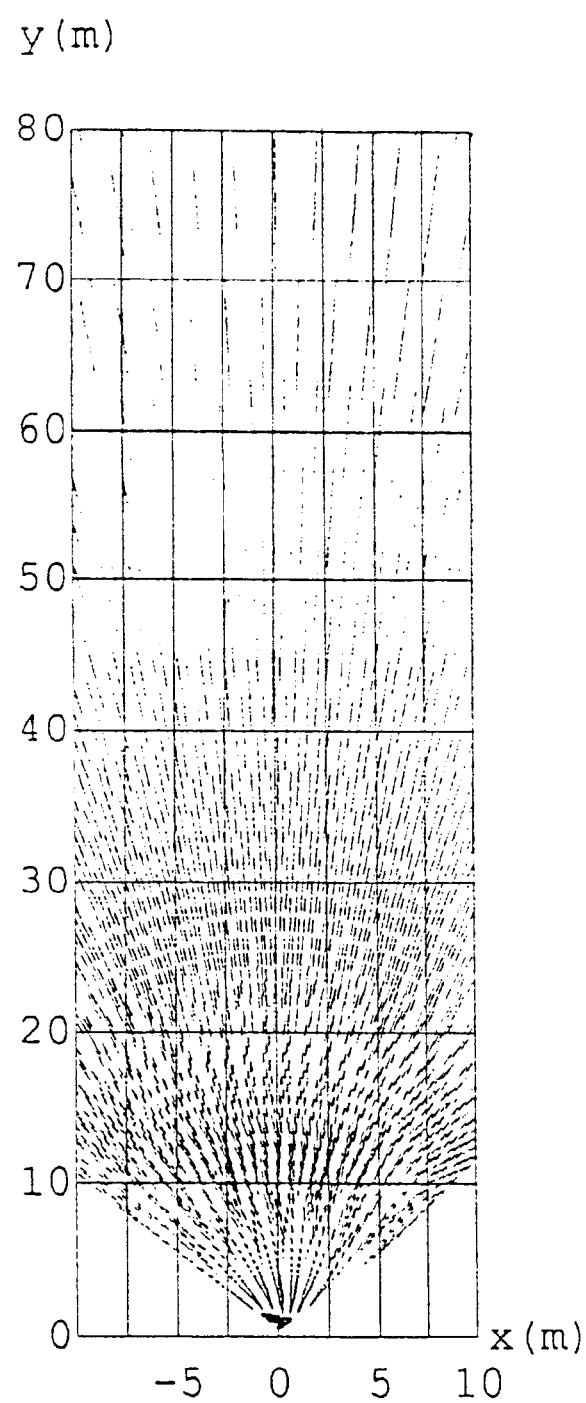
FIG. 15 illustrates intersections of two beams centered at the points illustrated in FIG. 12.

We should consider beam width of the light emitted from the optical radar units. Two beams with beam width D make a parallelogram abcd at the intersection as shown in FIG. 14. The scanning point p is the center of the parallelogram. Any object inside the parallelogram is detected by optical radar units OR1 and OR2. In this example, the beam width is D=2 cm. The size of the parallelogram abcd depends on angles A and B. Length bd is less than 2.83 cm at any angles A and B for 45°≦A,B≦135°. Length ac increases as the y coordinate of the center of the parallelogram increases. Hence, the parallelogram looks like a line ac at large y. FIG. 15 illustrates the lines ac centered at the scanning points in FIG. 12. For 25 m≦y≦60 m, the gap between two neighboring lines is less than 1.6 m and the length of the lines is less than 2.3 m. For 10 m≦y≦25 m, the gap between two neighboring lines is less than 1.13 m and the length of the line is less than 0.75 m. For 0.5 m≦y≦10 m, the gap between two neighboring lines is less than 0.65 m and the length of the lines is less than 0.32 m. Hence, in 0.5 m≦y≦5 m, the position measuring apparatus can accurately measure the position of object within the error of Δx≦0.65 m and Δy≦0.32 m. By changing the scanning program, the apparatus can more accurately estimate the position. Thus, the position measuring apparatus in this example can detect objects like vehicles and estimate their positions in the range 0.5 m≦y≦70 m.

Figure 16:
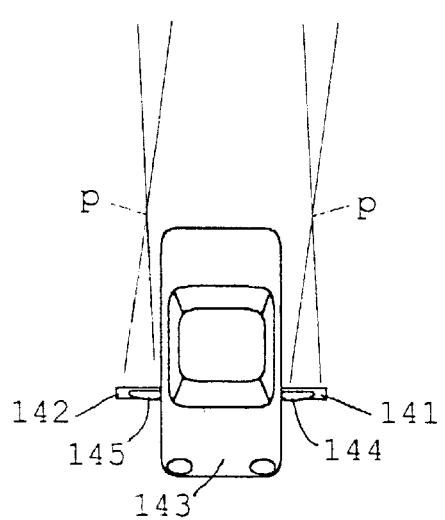
FIG. 16 illustrates the optical radar units mounted under the sideview mirrors.
Figure 17:
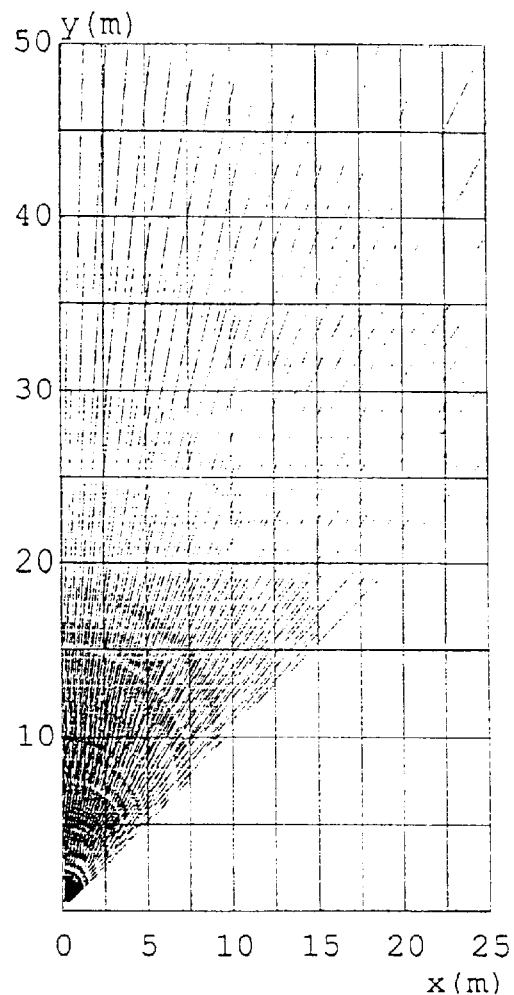
FIG. 17 illustrates an example of scanning an area with the set of optical radar units mounted under the sideview mirrors.

FIG. 16 illustrates a second example wherein two position measuring apparatuses 141, 142 are mounted under the sidemirrors 144 and 145 respectively. In this second example, the parameters in FIG. 9 are chosen as follows: d=20 cm; e=2.5 cm; A1=0.5°; and B1=0.3°. At a given angle pair (A,B), the optical radar units scan the points p1, p4, p13 and p16 in FIG. 9 for 0.5 m≦y≦6 m and the points p1, p4, p13, p16, p5, p9, p12, p8, p2, p6, p10 and p14 for 6 m≦y≦50 m. The beam width is D=1.2 cm. The steps of angles A and B are 1° and 0.6°, respectively. The range of angles A and B are 45°≦A≦90° and 45°≦B≦135°. FIG. 17 illustrates the scanning of the position measuring apparatus 141. In this figure, the origin of x and y coordinates is the center of the position measuring apparatus 141. Total number of steps of the stepping motors to scan the area is 605. If start-stop rate of the stepping motors is higher than 3000 pulse per second, then it takes less than 0.21 seconds for the apparatus 141 to scan the area in FIG. 17. For 10 m≦y≦50 m, the gap between two neighboring lines is less than 1.36 m and the length of the lines is less than 4.44 m. For 0.5 m≦y≦10 m, the gap between two neighboring lines is less than 0.28 m and the length of the lines is less than 1 m. Thus, the position measuring apparatus can detect objects like vehicles and estimate their positions in the range, 0.5 m≦y≦50 m.

By combining the above two examples, the position measuring apparatuses scan an area around the vehicle equipped with the apparatuses. By storing several scanning programs in the ROM, one can select different scanning areas.

Figure 18:
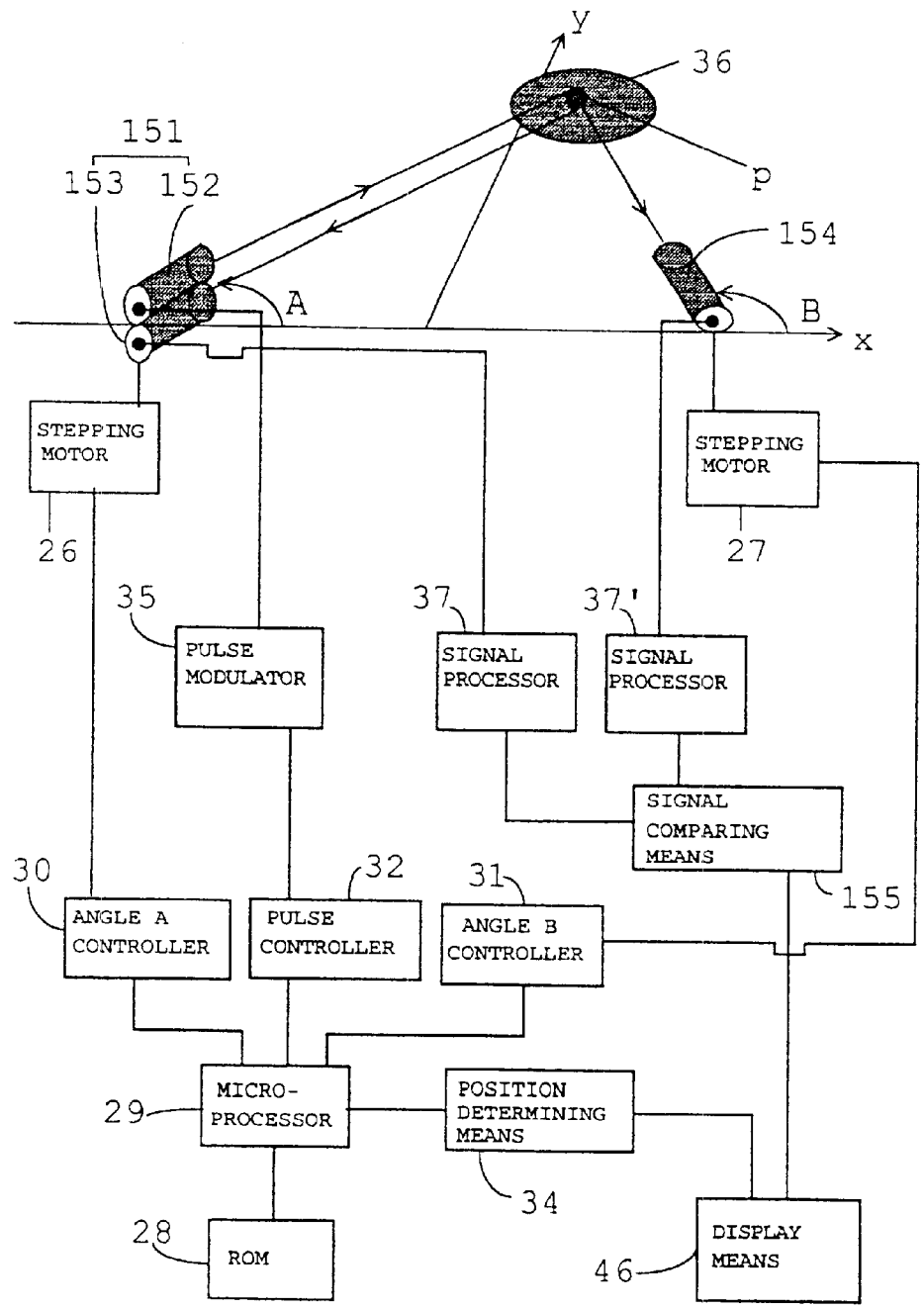
FIG. 18 is a block diagram for the third embodiment of the present invention.

A third embodiment is designed to use at least one optical radar unit and at least one light detecting means separated by a distance d. The optical radar unit can emit light pulses in a direction and receive light pulses coming from the same direction as the emitted light beam. The light detecting means can receive light pulse coming from a direction. FIG. 18 illustrates a block diagram for the third embodiment. The optical radar unit 151 comprises a light emitting means 152 and a light detecting means 153 in a parallel direction with each other. The optical radar unit 151 and a light detecting means 154 are directed to point p. The light emitting means 152 of the optical radar unit 151 emits a light pulse to the point p and the light detecting means 153 of the optical radar unit 151 and the light detecting means 154 detect the light pulse reflected from the point p at the same time. The detected signals from the two separate light detecting means 153 and 154 are processed by two signal processors 37 and 37' and compared in a signal comparing means 155. If there is an object at the point p, then the light detecting means 153 and 154 detect the reflected light pulses from the point at two different times whose difference is less than d/(speed of light). Hence, if the time difference of the two detected signals is less than d/(speed of light), then the signal comparing means produces a nonzero output indicating an object. An example of the signal comparing means can be a multiplier circuit. In this case, the width of the light pulse must be larger than d/(speed of light). The output of the signal comparing means is displayed at the position of the point p on a display means. The functions of other components in FIG. 18 are same as those in FIG. 5. The third embodiment simplifies the construction of the apparatus without using two separate light emitting means and a switching means used in the first and the second embodiment. However, the third embodiment is not as interference-free as the first and the second embodiment.

Thus, in accordance with the present invention, the position measuring apparatus can detect object like vehicles and estimate their positions without interference from other vehicles equipped with the same systems as illustrated in FIGS. 8a–8c. Also, the position measuring apparatus can accurately measure positions of objects in short range without using sophisticated means.

Although the preferred embodiments of the present invention have been described in detail, it should be understood that various changes and modifications may be made therein without departing from the scope of the appended claims. For example, rotable mirrors or acoust-optic diffraction can be used to change the direction of the light beams.

We claim:

1. A method for measuring a position of an object employing at least two separate optical radar units separated by a distance, wherein each optical radar unit can emit light pulses in a direction and receive light pulses coming from the same direction as the emitted light beam, comprising:

setting the two separate optical radar units such that the two separate optical radar units are directed to a point;

emitting a light pulse to the point at time t by one of the two optical radar units, which is called the first optical radar unit and detecting the light pulse reflected from the point by the other optical radar unit, which is called the second optical radar unit;

switching the functions of the two optical radar units after a switching time interval dt such that the second optical radar unit emits a light pulse to the point at time t+dt and the first optical radar unit detects the light pulse reflected from the point;

comparing the two signals detected by the first and the second optical radar units to determine whether the time difference of the two detected signals is the switching time interval dt;

determining the position of the point on the basis of the two directions and the separation of the two optical radar units;

displaying the result of the comparison of the two detected signals at the position of the point to determine whether an object is at the point and to measure the position of the object if the object is at the point; and scanning a predetermined area by changing the two directions of the two optical radar units.

2. The method of claim 1, further comprising:

storing at least one predetermined sequence of the two directions of the two optical radar units; and scanning a predetermined area.

3. An apparatus for measuring a position of an object comprising:

at least two optical radar units separated by a distance, each of which can emit light pulses in a direction and receive light pulses coming from the same direction;

a direction changing means for changing the directions of the two optical radar units such that the two optical radar units are directed to a point;

a signal processor that processes signals detected by the optical radar units;

a switch controller and switch that switch the functions of the two optical radar units after a switching time interval dt;

a signal comparing means for comparing the detected signals;

a position determining means for calculating the position of the point using the directions of the two optical units and the distance;

a display means for displaying the output of the signal comparing means at the position of the point to determine whether an object is at the point and to measure the position of the object if the object is at the point;

a memory that stores at least one predetermined sequence of two directions of the two optical radar units; and a microprocessor that executes the sequence stored in the memory.

4. The apparatus of claim 3, wherein the signal comparing means comprises a time delay circuit and a multiplier circuit.

5. A method for measuring a position of an object employing an optical radar unit and a light detecting means separated by a distance, wherein the optical radar unit can emit light pulses in a first direction and receive light pulses coming from the same direction as the emitted light beam, and wherein the light detecting means can detect light pulses coming from a second direction, comprising:

setting directions of the optical radar unit and the light detecting means such that the optical radar unit and the light detecting means are directed to a point;

emitting a light pulse to the point by the optical radar unit;

detecting the light pulse reflected from the point by the optical radar unit and the light detecting means at the same time;

comparing the two signals detected by the optical radar unit and the light detecting means to determine whether the optical radar unit and the light detecting means detected the reflected light pulse at the same time;

determining the position of the point on the basis of the two directions and the distance;

displaying the position of the point from the signal comparing means to determine whether an object is at the point and to measure the position of the object if the object is at the point; and scanning a predetermined area by changing the directions of the optical radar unit and the light detecting means.

6. The method of claim 5, further comprising:

storing at least one predetermined sequence of the two directions of the optical radar unit and the light detecting means;

scanning the predetermined area;

executing the at least one predetermined sequence.

* * * * *